US009490652B2

(12) United States Patent
Kim

(10) Patent No.: US 9,490,652 B2
(45) Date of Patent: Nov. 8, 2016

(54) WIRELESS CHARGER EQUIPPED WITH AUXILIARY POWER SUPPLY AND AUXILIARY POWER DEVICE

(71) Applicant: LG INNOTEK CO., LTD., Seoul (KR)

(72) Inventor: Sang Beom Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 383 days.

(21) Appl. No.: 14/148,952

(22) Filed: Jan. 7, 2014

(65) Prior Publication Data

US 2015/0028800 A1    Jan. 29, 2015

(30) Foreign Application Priority Data

Jul. 24, 2013  (KR) .................. 10-2013-0087400

(51) Int. Cl.

| H02J 7/00 | (2006.01) |
|---|---|
| H01F 27/42 | (2006.01) |
| H02J 7/02 | (2016.01) |
| H02J 5/00 | (2016.01) |
| H02J 17/00 | (2006.01) |

(52) U.S. Cl.
CPC .............. *H02J 7/025* (2013.01); *H02J 5/005* (2013.01); *H02J 7/0042* (2013.01); *H02J 7/0054* (2013.01); *H02J 7/0055* (2013.01); *H02J 7/0068* (2013.01); *H02J 17/00* (2013.01)

(58) Field of Classification Search
CPC ............................ H02J 7/025; H04B 5/0037
USPC ....................................................... 320/108
See application file for complete search history.

(56) References Cited

U.S. PATENT DOCUMENTS

| 7,546,186 B2* | 6/2009 | Yang ..................... B60K 6/387 |
| | | 477/3 |
| 7,952,322 B2* | 5/2011 | Partovi .................. H01F 5/003 |
| | | 320/108 |
| 8,620,484 B2* | 12/2013 | Baarman ................ H01F 38/14 |
| | | 320/106 |
| 8,796,885 B2* | 8/2014 | Tan ........................ H02J 5/005 |
| | | 307/104 |
| 8,970,070 B2* | 3/2015 | Sada ....................... H02J 5/005 |
| | | 307/104 |
| 2007/0182368 A1 | 8/2007 | Yang |
| 2008/0211455 A1* | 9/2008 | Park ........................ H02J 7/025 |
| | | 320/108 |
| 2011/0241603 A1 | 10/2011 | Chang et al. |
| 2011/0298420 A1* | 12/2011 | Forsberg .............. A61N 1/3787 |
| | | 320/108 |
| 2012/0286724 A1 | 11/2012 | Tsai |
| 2014/0097697 A1* | 4/2014 | Cho ......................... G06F 1/26 |
| | | 307/104 |

FOREIGN PATENT DOCUMENTS

EP    2469682 A1    6/2012

OTHER PUBLICATIONS

European Search Report for European Application No. 13199080.6 which corresponds to the above-identified U.S. application.

* cited by examiner

*Primary Examiner* — M'Baye Diao
(74) *Attorney, Agent, or Firm* — LRK Patent Law Firm

(57) ABSTRACT

A wireless charger equipped with an auxiliary power supply includes a power input unit which is connected to an external power supply, a wireless power transmission unit which wirelessly transmits electrical power to an electronic device through a magnetic field, and an auxiliary power unit which charges a battery provided therein with electrical power supplied from the power input unit, or charges the battery and, at the same time, provides the electrical power to the wireless power transmission unit, and provides the electrical power of the battery provided therein to the wireless power transmission unit when the power supply from the power input unit is stopped.

9 Claims, 7 Drawing Sheets

WIRELESS CHARGER EQUIPPED WITH AUXILIARY POWER SUPPLY AND AUXILIARY POWER DEVICE

CROSS-REFERENCE TO RELATED PATENT APPLICATION

This application claims the benefit of Korean Patent Application No. 10-2013-0087400, filed on Jul. 24, 2013, in the Korean Intellectual Property Office, the disclosure of which is incorporated herein in its entirety by reference.

BACKGROUND OF THE INVENTION

1. Field of the Invention

The present invention relates to a wireless charger and, more particularly, to a wireless charger equipped with an auxiliary power supply and an auxiliary power device detachably connected to the wireless charger.

2. Description of the Related Art

Portable electronic devices such as mobile phones, notebook computers, PDAs, etc. store electrical energy in a battery provided therein such that a user can use them while moving, and a separate charger is required to charge each portable electronic device.

In generally, the charger charges the portable electronic device while being connected to a commercial power supply through a wire, and thus the portability is deteriorated. Moreover, the terminals are different for each portable electronic device, and thus it is inconvenient to separately prepare or purchase a suitable charger for each portable electronic device.

A charger employing a non-contact magnetic induction method, i.e., a wireless charging method (hereinafter referred to as a wireless charger) has been disclosed in the prior art to solve this problem. Thus, with the use of the wireless charger of the prior art, the portable electronic device can be charged without any direct connection to the portable electronic device.

However, even in the case where the portable electronic device is charged using the wireless charger of the prior art, the wireless charger itself is still required to connect to an AD/DC adapter or a separate wired means such as a dedicated cable, thus reducing the portability.

Moreover, in the case where a separate wired means compatible with the wireless charger is not prepared, it is impossible to charge the portable electronic device using the wireless charger.

Furthermore, in the case where the wireless charger is connected to a wired means (e.g., USB), instead of a dedicated adapter, it is impossible to provide a sufficient voltage or current required to charge the portable electronic device.

SUMMARY OF THE INVENTION

The present invention has been made in an effort to solve the above-described problems associated with prior art, and an object of the present invention is to eliminate the inconvenience of a user having to prepare a separate wired means and enhance the portability of a wireless charger by mounting an auxiliary power source in the wireless charger.

Another object of the present invention is to enable various portable electronic devices to be charged using a single wireless charger equipped with an auxiliary power supply, thereby eliminating the inconvenience and waste of having to prepare or purchase a separate wired means for each portable electronic device.

Still another object of the present invention is to allow a user to charge a portable electronic device even in a situation where the connection to a commercial power supply is difficult by mounting an auxiliary power source in a wireless charger.

Yet another object of the present invention is to provide an auxiliary power device attachable to a wireless charger such that a user can independently use the wireless charger and the auxiliary power device according to the user's circumstances.

In order to achieve the above objects, there is provided a wireless charger equipped with an auxiliary power supply, the wireless charger comprising: a power input unit which is connected to an external power supply; a wireless power transmission unit which wirelessly transmits electrical power to an electronic device through a magnetic field; and an auxiliary power unit which charges a battery provided therein with electrical power supplied from the power input unit, or charges the battery and, at the same time, provides the electrical power to the wireless power transmission unit, and provides the electrical power of the battery provided therein to the wireless power transmission unit when the power supply from the power input unit is stopped.

The auxiliary power unit may further includes: the battery; a charge/discharge module which charges the battery with the electrical power supplied from the power input unit and outputs the electrical power stored in the battery when the power supply from the power input unit is stopped; and a boost converter which boosts the voltage of the electrical power output from the charge/discharge module and provides the boosted voltage to the wireless power transmission unit.

The wireless charger may further include a wired output unit which is connected in parallel to the wireless power transmission unit.

In order to achieve the above objects, there is provided a wireless charger equipped with an auxiliary power supply, the wireless charger comprising: a first power input unit; a second power input unit; a wireless power transmission unit which converts electrical power, supplied from the first power input unit or the second power input unit, into a magnetic field and charges an electronic device; and an auxiliary power unit which includes an input terminal, an output terminal, and a battery, the input terminal being connected to the first power input unit and the second power input unit, wherein the auxiliary power unit charges the battery with electrical power supplied from the first power input unit or the second power input unit to the input terminal, or charges the battery and, at the same time, provides the electrical power to the wireless power transmission unit through the output terminal, and provides the electrical power stored in the battery to the wireless power transmission unit through the output terminal when the electrical power supplied from the first power input unit and the second power input unit to the input terminal is cut off.

The auxiliary power unit may further include: a charge/discharge module which charges the battery with the electrical power supplied from the first power input unit or the second power input unit to the input terminal and generates electrical power by discharging the battery when the electrical power supplied from the first power input unit and the second power input unit is cut off; and a boost converter which boosts the voltage of the electrical power generated by the charge/discharge module and provides the boosted voltage to the output terminal.

The wireless charger may further include a wired output unit which is connected in parallel to the wireless power transmission unit.

The wireless charger may further include a connector which electrically connects the first power input unit, the second power input unit, and the input terminal and electrically connects the output terminal and the wireless power transmission unit, wherein the second power input unit, the input terminal, and the output terminal are detachably connected to the connector.

The wireless charger may further include a switch which opens and closes the electrical connection between the first power input unit and the wireless power transmission unit.

In order to achieve the above objects, there is provided an auxiliary power device which is detachably connected to a wireless charger which includes a first power input unit, a wireless power transmission unit, and a connector, the auxiliary power device comprising: a second power input unit; and an auxiliary power unit which includes an input terminal, an output terminal, and a battery, the input terminal being connected to the first power input unit or the second power input unit, wherein the auxiliary power unit charges the battery with electrical power supplied from the first power input unit or the second power input unit to the input terminal, or charges the battery and, at the same time, provides the electrical power to the wireless power transmission unit through the output terminal, and provides the electrical power stored in the battery to the wireless power transmission unit through the output terminal when the electrical power supplied from the first power input unit and the second power input unit to the input terminal is cut off.

The auxiliary power device may further include a wired output unit which is connected to the output terminal of the auxiliary power unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification. In the description of the present invention, detailed explanations of related art are omitted when it is deemed that they may unnecessarily obscure the essence of the present invention.

Hereinafter, the embodiments of the present invention will be described with reference to the accompanying drawings.

Figure 1:
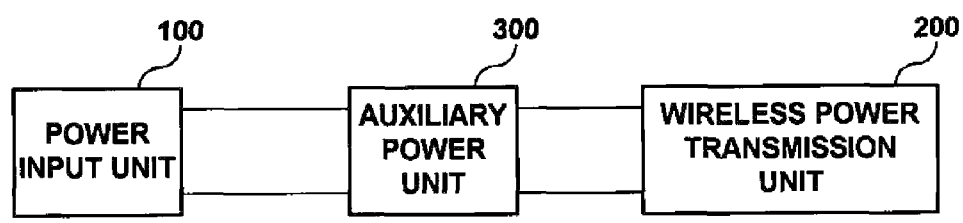
FIGS. 1 and 2 are schematic diagrams showing the configuration of a wireless charger equipped with an auxiliary power supply in accordance with an embodiment of the present invention.
Figure 2:
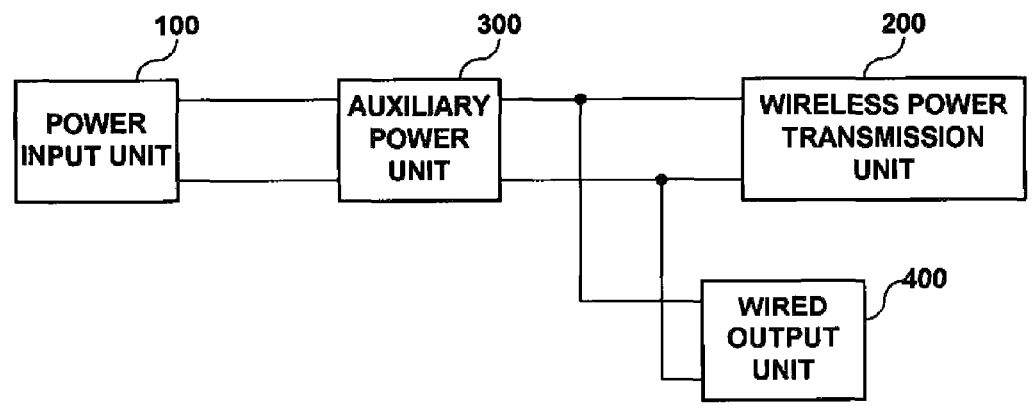

FIGS. 1 and 2 are schematic diagrams showing the configuration of a wireless charger equipped with an auxiliary power supply in accordance with an embodiment of the present invention.

Referring to FIG. 1, a wireless charger equipped with an auxiliary power supply in accordance with an embodiment of the present invention may comprise a power input unit 100, an auxiliary power unit 300, and a wireless power transmission unit 200. That is, the wireless charger has a structure in which the wireless power transmission unit 200 and the auxiliary power unit 300 are connected.

The power input unit 100 is connected to an external power supply (e.g., a commercial power supply) and serves to provide electrical power to the auxiliary power unit 300.

The wireless power transmission unit 200 receives electrical power using a magnetic field and charges a portable electronic device.

Here, the wireless power transmission unit 200 comprises all means capable of generating a magnetic field using electrical energy by various methods such as a magnetic resonance method, an electromagnetic wave method, a magnetic induction method, etc. and then charging the portable electronic device.

The auxiliary power unit 300 stores the electrical power supplied from the power input unit 100 in a battery 320 provided therein. Here, the auxiliary power unit 300 may charge the battery 320 provided therein and, at the same time, provide the output power to the wireless power transmission unit 200, thereby generating a magnetic field that can charge the electronic device.

Moreover, when the power supply from the power input unit 100 is stopped, the auxiliary power unit 300 discharges the battery 320 provided therein and supplies electrical power generated by the discharge to the wireless power transmission unit 200.

For example, when a user accidentally or intentionally cuts off the connection between the external power supply such as a commercial power supply and the power input unit 100, the auxiliary power unit 300 switches the battery 320 provided therein from a charge mode to a discharge mode. However, if there is no portable electronic device that is to wirelessly receive electrical power through the magnetic field from the wireless power transmission unit 200 even when the power supply from the power input unit 100 is cut off, the auxiliary power unit 300 may maintain the battery 320 in a neutral condition without switching to the discharge mode. In this case, the battery 320 may be a secondary battery, but not limited thereto.

Meanwhile, according to another embodiment of the present invention, the auxiliary power unit 300 may further include a charge/discharge module 310 and a boost converter 330.

The charge/discharge module 310 receives electrical power from the power input unit 100 and charges the battery 320 with the received electrical power. Moreover, when the power supply from the power input unit 100 is cut off, the charge/discharge module 310 switches the charge mode of the battery 320 to the discharge mode.

The boost converter 330 is used when the output voltage is higher than the input voltage. Accordingly, the boost converter 330 in accordance with an embodiment of the present invention serves to receive the voltage output from the charge/discharge module 310, boosts the received voltage, and provides the boosted voltage to the wireless power transmission unit 200.

For example, it can be assumed that a voltage of 5 V, which is applied from the power input unit 100 to the auxiliary power unit 300, drops to 3 V while passing through the charge/discharge module 310. At this time, when the voltage of 3 V output from the charge/discharge module 310 is immediately supplied to the wireless power transmission unit 200, the wireless power transmission unit 200 cannot generate a sufficiently large magnetic field required to charge the portable electronic device. Thus, the boost converter 330 is connected between the charge/discharge module 310 and the wireless charger to boost the voltage output from the charge/discharge module 310.

FIG. 2 is a schematic diagram showing another configuration of the wireless charger in accordance with an embodiment of the present invention.

Referring to FIG. 2, the wireless charger equipped with the auxiliary power supply in accordance with an embodiment of the present invention may further include a wired output unit 400 connected in parallel to the wireless power transmission unit 200. The wired output unit 400 is used to provide wired charging in the case where the wireless power transmission unit 200 cannot operate due to a failure or in the case where the portable electronic device cannot receive the magnetic field output from the wireless power transmission unit 200.

Figure 3:
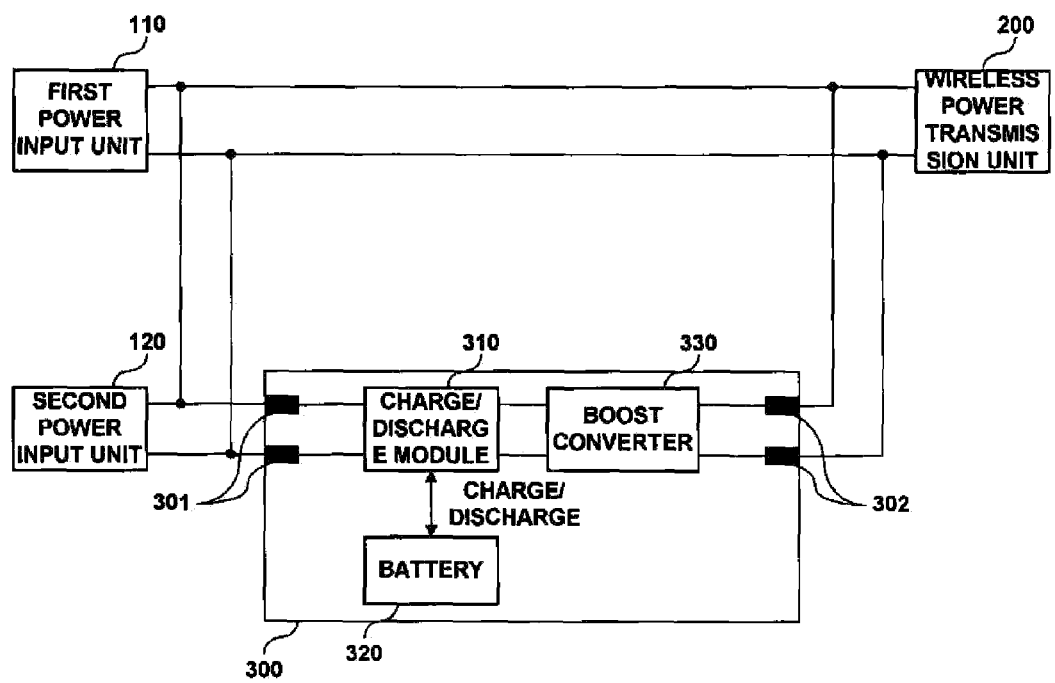
FIGS. 3 and 4 are schematic diagrams showing the configuration of a wireless charger equipped with an auxiliary power supply in accordance with another embodiment of the present invention.
Figure 4:
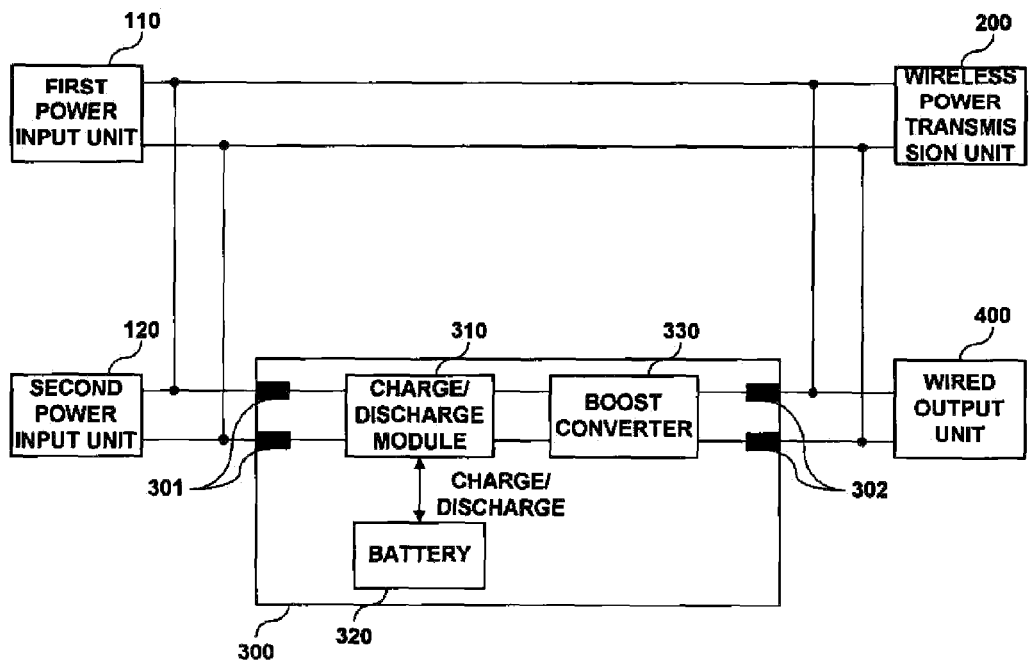

FIGS. 3 and 4 are schematic diagrams showing the configuration of a wireless charger equipped with an auxiliary power supply in accordance with another embodiment of the present invention.

Referring to FIG. 3, a wireless charger equipped with an auxiliary power supply in accordance with another embodiment of the present invention may include a first power input unit 110, a second power input unit 120, an auxiliary power unit 300, and a wireless power transmission unit 200.

The first power input unit 110 and the second power input unit 120 are connected to an external power supply (e.g., a commercial power supply) and serves to provide electrical power to the auxiliary power unit 300.

The wireless power transmission unit 200 converts electrical power, supplied from the first power input unit 110 and the second power input unit 120, into a magnetic field and charges the portable electronic device. As shown in FIG. 3, the first power input unit 110 and the second power input unit 120 are connected in parallel, and thus when any one of the first power input unit 110 and the second power input unit 120 is connected to the external power supply, the electrical power can be supplied to the wireless power transmission unit 200.

The auxiliary power unit 300 may comprise an input terminal 301, an output terminal 302, and a battery 320. Here, the input terminal 301 is connected to the first power input unit 110 and the second power input unit 120. Moreover, the input terminal 310 receives electrical power from the first power input unit 110 and the second power input unit 120 and charges the battery 320. In this case, the auxiliary power unit 300 may charge the battery 320 provided therein and, at the same time, provide the electrical power output from the output terminal 302 to the wireless power transmission unit 200.

Meanwhile, when the connection of the input terminal 301 to both the first power input unit 110 and the second power input unit 120 is cut off and thus the electrical power supplied from the external power supply is cut off, the auxiliary power unit 300 may switch the battery 320 from the charge mode to the discharge mode to generate electrical power and provide the generated electrical power to the wireless power transmission unit 200 through the output terminal 302. In this case, the battery 320 may be a secondary battery, but not limited thereto.

In the wireless charger equipped with the auxiliary power supply in accordance with another embodiment of the present invention, the auxiliary power unit 300 may further include a charge/discharge module 310 and a boost converter 330.

The charge/discharge module 310 receives electrical power from at least one of the first power input unit 110 and the second power input unit 120 and charges the battery 320 with the received electrical power. In this case, the charge/discharge module 310 may charge the battery 320 and, at the same time, provide the electrical power to the wireless power transmission unit 200 connected to the output terminal 302. Moreover, when both the first power input unit 110 and the second power input unit 120 are disconnected from the external power supply and thus the electrical power supplied to the input terminal 301 is cut off, the charge/discharge module 310 generates electrical power by discharging the battery 320 and supplies the generated electrical power to the wireless power transmission unit 200.

The boost converter 330 serves to boost the voltage received from the charge/discharge module 310 and provide the boosted voltage to the wireless power transmission unit 200 connected to the output terminal 302.

Moreover, the wireless charger equipped with the auxiliary power supply in accordance with another embodiment of the present invention may further include a wired output unit 400 connected in parallel to the wireless power transmission unit 200. As shown in FIG. 4, the wired output unit 400 may be connected in parallel to the wireless power transmission unit 200, but not limited thereto. The wired output unit 400 is used to provide wired charging in the case where the wireless power transmission unit 200 cannot operate due to a failure or in the case where the portable electronic device cannot receive the magnetic field output from the wireless power transmission unit 200.

Figure 5:
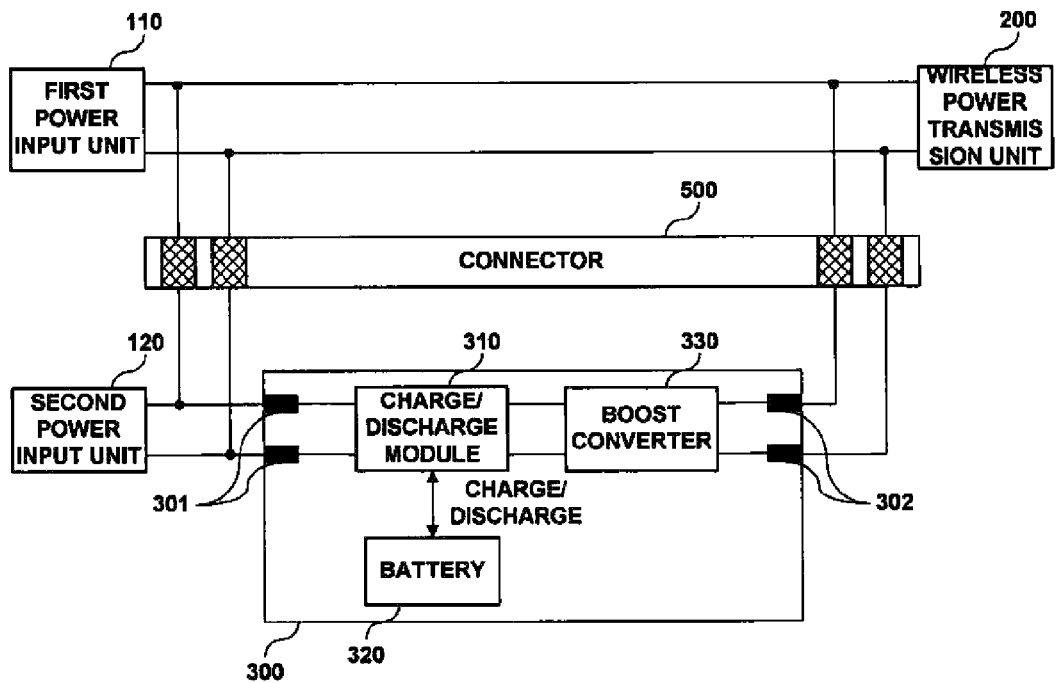
FIGS. 5 to 7 are diagrams showing examples in which an auxiliary power source and a wireless power transmission unit according to the present invention are detachably connected by means of a connector.
Figure 6:
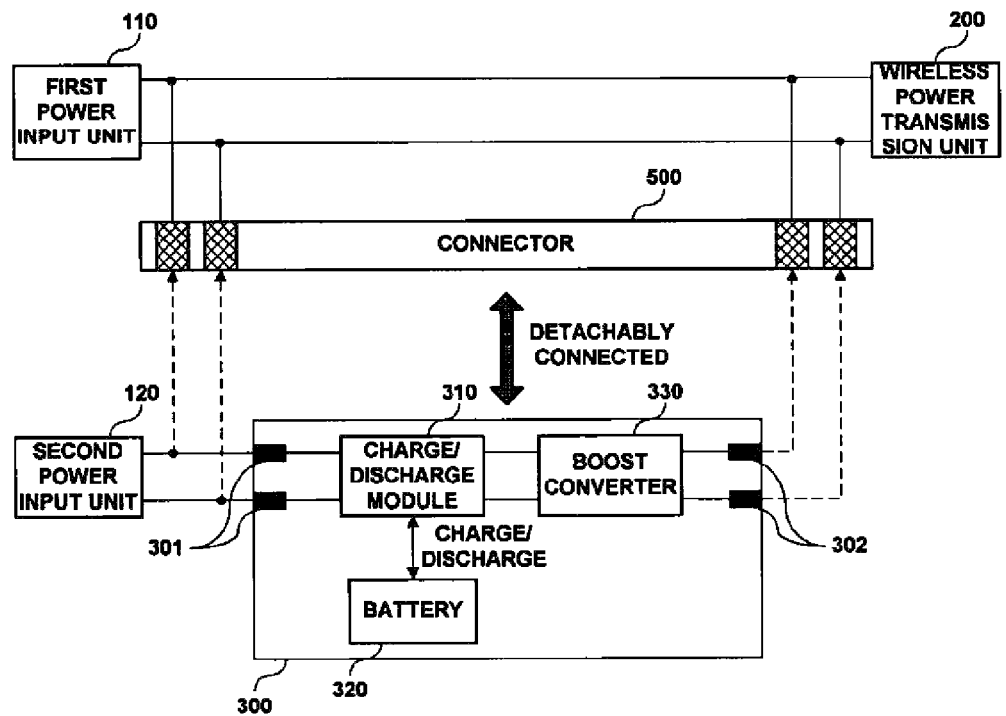
Figure 7:
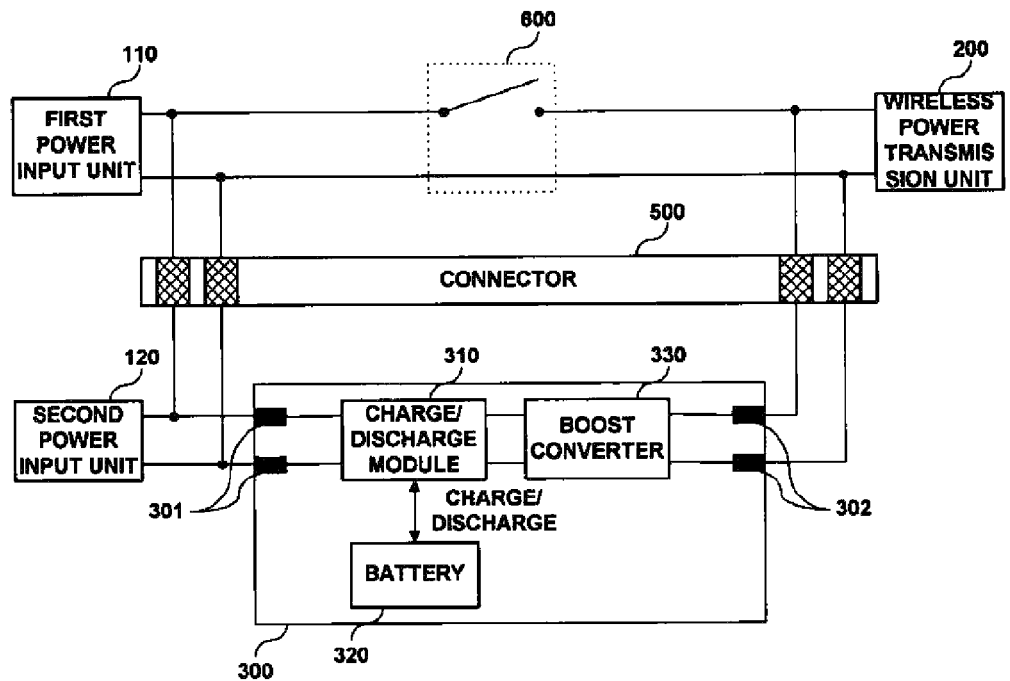
Figure 8:
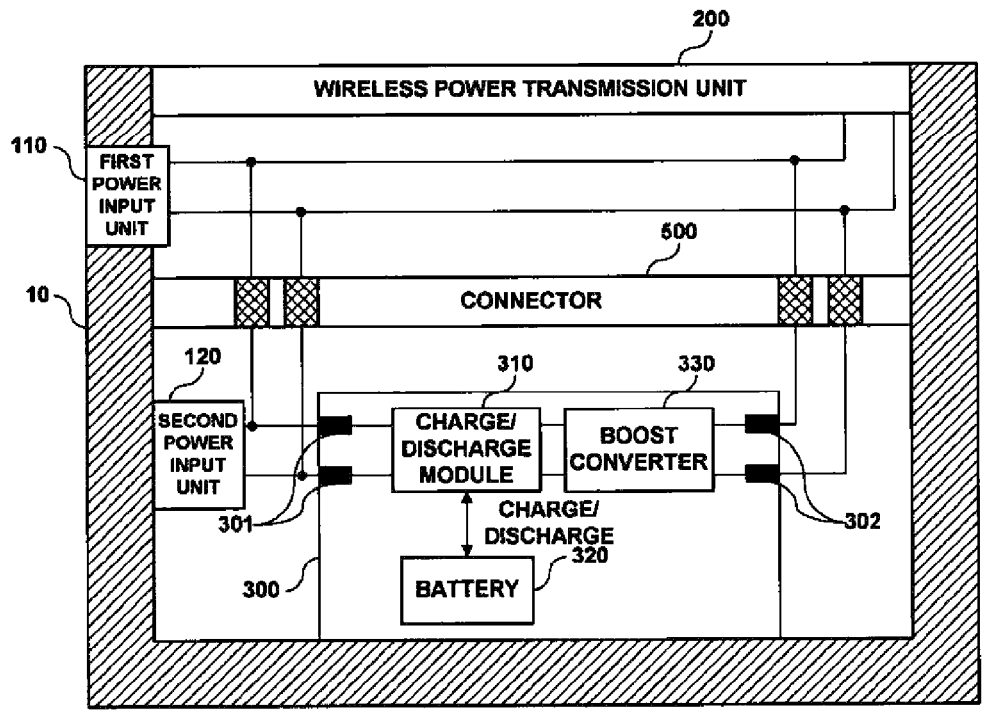
FIGS. 8 to 10 are diagrams showing examples in which a wireless charger equipped with an auxiliary power source according to the present invention is mounted in a case.
Figure 9:
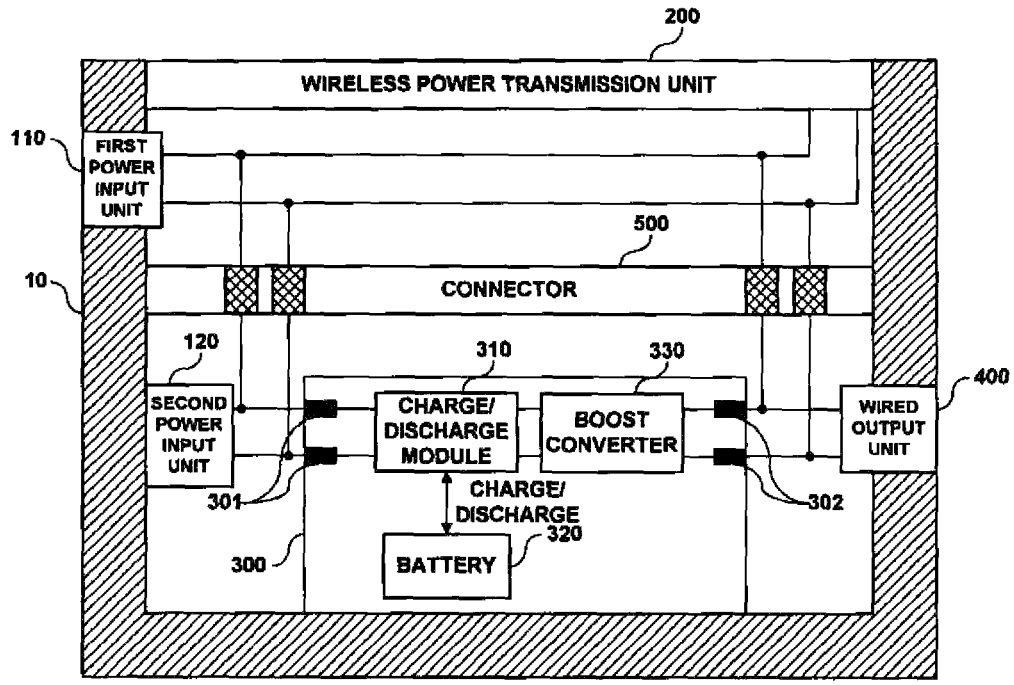
Figure 10:
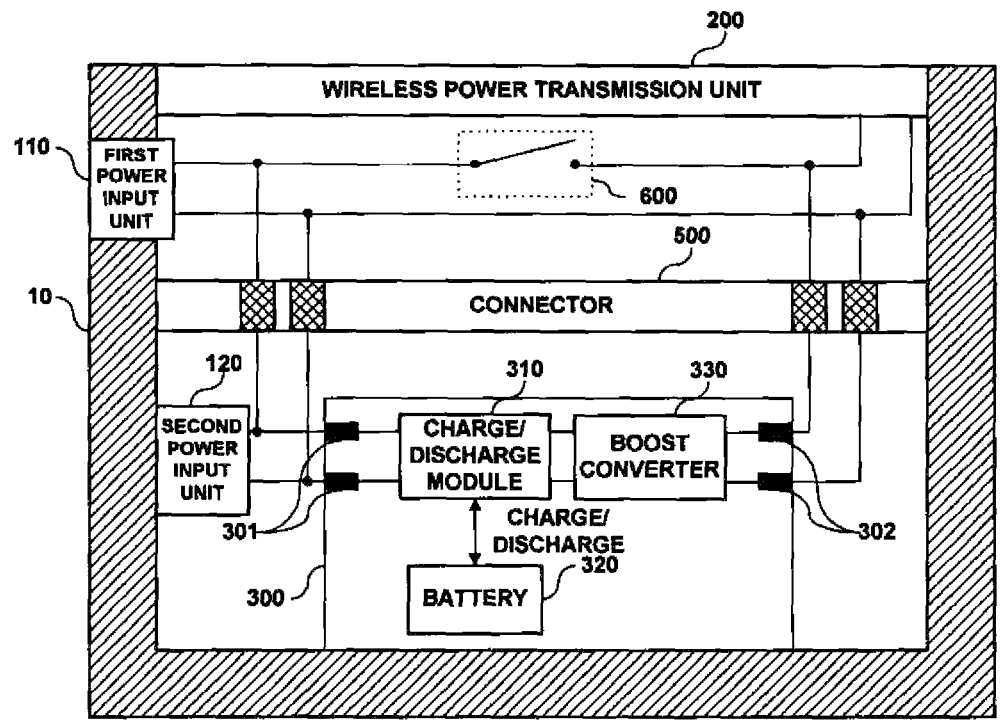

FIGS. 5 to 7 are diagrams showing examples in which an auxiliary power source and a wireless power transmission unit 200 according to the present invention are detachably connected by means of a connector, and FIGS. 8 to 10 are diagrams showing examples in which a wireless charger equipped with an auxiliary power source according to the present invention is mounted in a case 10.

Referring to FIGS. 5 to 7, a wireless charger equipped with an auxiliary power supply in accordance with an embodiment of the present invention may further include a connector 500.

The connector 500 electrically connects the first power input unit 110, the second power input unit 120, and the input terminal 301 and electrically connects the output terminal 302 and the wireless power transmission unit 200. Referring to FIG. 6, the connector 500 may physically and electrically connect and disconnect the wireless power transmission unit 200 and the auxiliary power unit 300 according to a user's operation. In detail, the second power input unit 120 and the input terminal 301 are connected to the connector 500 and thus electrically connected to the first power input unit 110, and the output terminal 302 is connected to the connector 500 and thus electrically connected to the wireless power transmission unit 200. As a result, the second power input unit 120 and the auxiliary power unit 300 can be connected to or disconnected from the connector 500.

Moreover, as shown in FIGS. 8 to 10, when the second power input unit 120 and the auxiliary power unit 300 are connected to the connector 500, the second power input unit 120 may be located on the inner surface of a case 10. That is, only the first power input unit 110 can be connected to the external power supply, and thus it is possible to prevent a conflict between the power supplies, which may occur when the external power supply is applied to both the first power input unit 110 and the second power input unit 120.

The wireless charger equipped with the auxiliary power supply in accordance with an embodiment of the present invention may further include a wired output unit 400. Referring to FIG. 9, the wired output unit 400 may be connected in parallel to the wireless power transmission unit 200, but not limited thereto. The wired output unit 400 is used to provide wired charging in the case where the wireless power transmission unit 200 cannot operate due to a failure or in the case where the portable electronic device cannot receive the magnetic field output from the wireless power transmission unit 200.

Meanwhile, referring to FIGS. 7 to 10, the wireless charger equipped with the auxiliary power supply in accordance with another embodiment of the present invention may further include a switch 600.

When electrical power at different voltages is applied to the first power input unit 110 and the second power input unit 120, respectively, various problems such as short-circuit, overcurrent, heat, etc. may occur due to a conflict between the power supplies. Here, the switch 500 can open the electrical connection between the first power input unit 110 and the wireless power transmission unit 200 when both the first power input unit 110 and the second power input unit 120 are connected to the external power supply and can electrically connect the first power input unit 110 and the wireless power transmission unit 200 when at least one of the first power input unit 110 and the second power input unit 120 is disconnected from the external power supply. Thus, it is possible to prevent a conflict between the power supplies, which may occur when different power supplies are applied at the same time.

Moreover, when the auxiliary power unit 300 and the wireless power transmission unit 200 are electrically connected by means of the connector 500, the switch 600 is opened, and thus it is possible to provide the electrical power supplied from the first power input unit 110 or the second power input unit 120 to the auxiliary power unit 300 to charge the battery 320 and then provide the electrical power to the wireless power transmission unit 200. Thus, it is possible to charge the battery 320 of the auxiliary power unit 300 and the portable electronic device at the same time.

Figure 11:
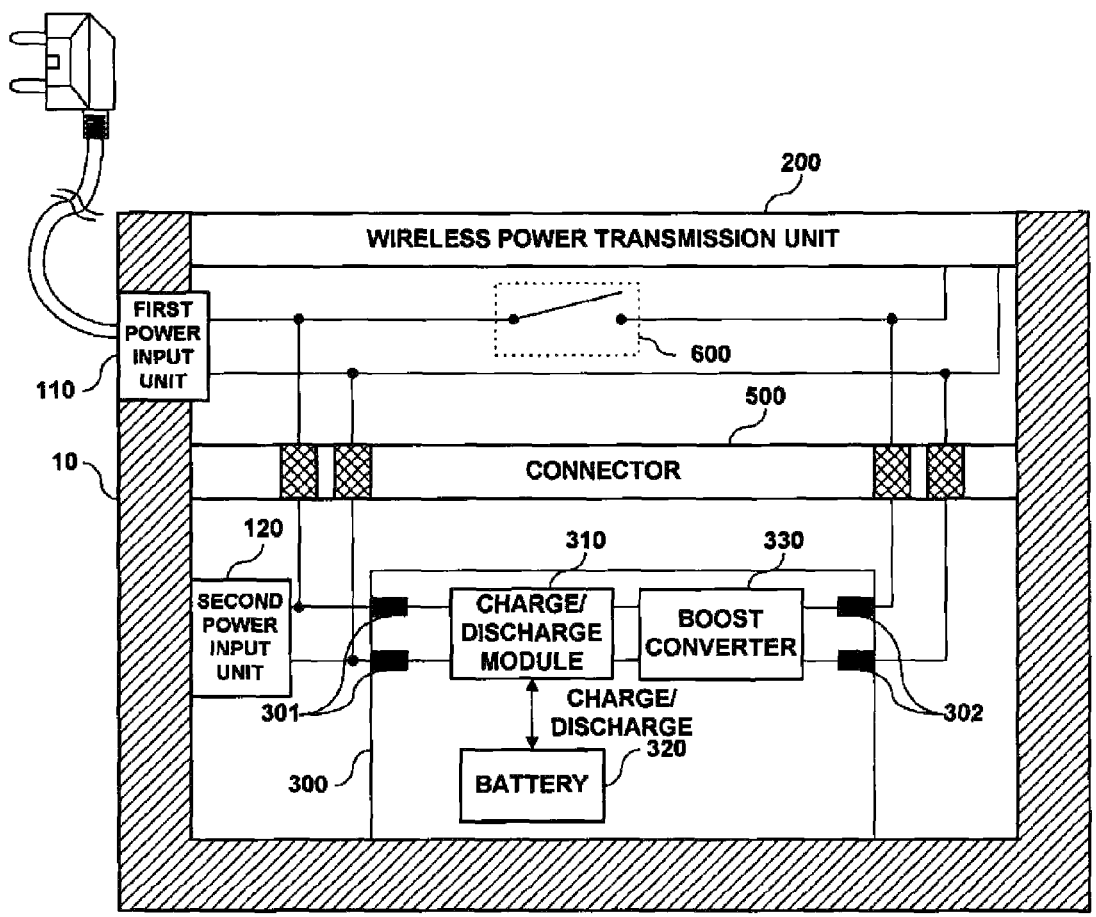
FIGS. 11 and 12 are diagrams showing that an auxiliary power device and a wireless charger in accordance with an embodiment of the present invention are connected and disconnected.
Figure 12:
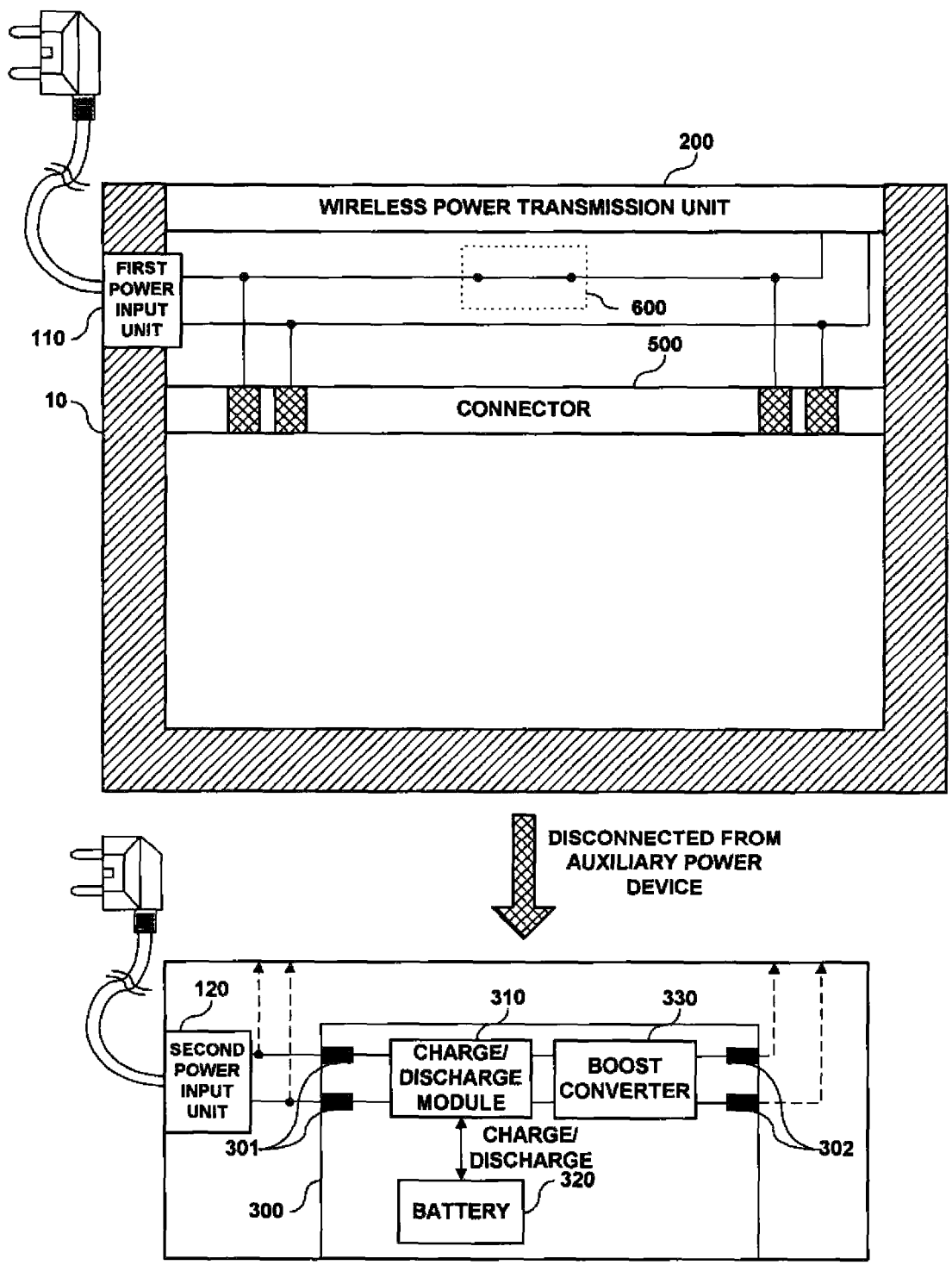

FIGS. 11 and 12 are diagrams showing that an auxiliary power device and a wireless charger in accordance with an embodiment of the present invention are connected and disconnected.

Referring to FIG. 11, an auxiliary power device in accordance with an embodiment of the present invention may include a second power input unit 120 and an auxiliary power unit 300 and may be detachably connected to a wireless charger comprising a first power input unit 110, a wireless power transmission unit 200, and a connector 500.

The second power input unit 120 is connected to an external power supply and serves to provide electrical power to the auxiliary power unit 300.

The auxiliary power unit 300 may include an input terminal 301, an output terminal 302, and a battery 320. Here, the input terminal 301 is electrically connected to the first power input unit 110 or the second power input unit 120 to receive electrical power. Moreover, the auxiliary power unit 300 may charge the battery 320 with the electrical power supplied from the first power input unit 110 or the second power input unit 120 to the input terminal 301 or charge the battery 320 and, at the same time, charge the portable electronic device by providing the electrical power to the wireless power transmission unit 200 through the output terminal 302. Furthermore, when the electrical power supplied from both the first power input unit 110 and the second power input unit 120 to the input terminal 301 is cut off, the auxiliary power unit 300 may provide electrical power generated by discharging the battery 320 to the wireless power transmission unit 200 through the output terminal 302.

Referring to FIG. 12, the auxiliary power device in accordance with an embodiment of the present invention can be disconnected from the wireless charger and used independently.

The wireless charger from which the auxiliary power device is disconnected receives an external power supply through the first power input unit 110 such that the wireless power transmission unit 200 can generate a magnetic field.

The auxiliary power device disconnected from the wireless charger receives an external power supply through the second power input unit 120 and charges the battery 320.

That is, the auxiliary power device can be used independently, and thus even when a wired means is not prepared or even when the connection to all the external power supplies is impossible, the auxiliary power device including the charged battery 320 can be connected to the wireless charger to charge the portable electronic device.

As described above, according to the embodiments of the present invention, an auxiliary power supply is mounted in a wireless charger, and thus it is possible to eliminate the inconvenience of having to prepare a separate wired means and enhance the portability.

Moreover, according to the embodiments of the present invention, it is possible to charge various portable electronic devices using a single wireless charge equipped with an auxiliary power supply, thereby eliminating the inconvenience and waste of having to prepare or purchase a separate wired means for each portable electronic device.

Furthermore according to the embodiments of the present invention, an auxiliary power source is mounted in a wireless charger, and thus it is possible to allow a user to charge a portable electronic device even in a situation where the connection to a commercial power supply is difficult.

In addition, according to the embodiments of the present invention, it is possible to provide an auxiliary power device attachable to a wireless charger such that a user can independently use the wireless charger and the auxiliary power device according to the user's circumstances.

The term "comprising" used in the above description means including the corresponding element, unless otherwise specified, and thus should be interpreted as further including other elements, not excluding others. While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A wireless charger including an auxiliary power supply, the wireless charger comprising:
   a power input unit which is connected to an external power supply;
   a wireless power transmission unit which wirelessly transmits electrical power to an electronic device through a magnetic field; and
   an auxiliary power unit which charges a battery provided therein with electrical power supplied from the power input unit, or charges the battery and, at the same time, provides the electrical power to the wireless power transmission unit, and provides the electrical power of the battery provided therein to the wireless power transmission unit when the power supply from the power input unit is stopped,
   wherein the auxiliary power unit comprises:
   the battery;
   a charge/discharge module which charges the battery with the electrical power supplied from the power input unit and outputs the electrical power stored in the battery when the power supply from the power input unit is stopped; and
   a boost converter which boosts the voltage of the electrical power output from the charge/discharge module and provides the boosted voltage to the wireless power transmission unit.

2. The wireless charger of claim 1, further comprising a wired output unit which is connected in parallel to the wireless power transmission unit.

3. A wireless charger including an auxiliary power supply, the wireless charger comprising:
   a first power input unit;
   a second power input unit;
   a wireless power transmission unit which converts electrical power, supplied from the first power input unit or the second power input unit, into a magnetic field and charges an electronic device; and
   an auxiliary power unit which includes an input terminal, an output terminal, and a battery, the input terminal being connected to the first power input unit and the second power input unit,
   wherein the auxiliary power unit charges the battery with electrical power supplied from the first power input unit or the second power input unit to the input terminal, or charges the battery and, at the same time, provides the electrical power to the wireless power transmission unit through the output terminal, and provides the electrical power stored in the battery to the wireless power transmission unit through the output terminal when the electrical power supplied from the first power input unit and the second power input unit to the input terminal is cut off.

4. The wireless charger of claim 3, wherein the auxiliary power unit further includes:
   a charge/discharge module which charges the battery with the electrical power supplied from the first power input unit or the second power input unit to the input terminal and generates electrical power by discharging the battery when the electrical power supplied from the first power input unit and the second power input unit is cut off; and
   a boost converter which boosts the voltage of the electrical power generated by the charge/discharge module and provides the boosted voltage to the output terminal.

5. The wireless charger of claim 3, further comprising a wired output unit which is connected in parallel to the wireless power transmission unit.

6. The wireless charger of claim 3, further comprising a connector which electrically connects the first power input unit, the second power input unit, and the input terminal and electrically connects the output terminal and the wireless power transmission unit, wherein the second power input unit, the input terminal, and the output terminal are detachably connected to the connector.

7. The wireless charger of claim 3, further comprising a switch which opens and closes the electrical connection between the first power input unit and the wireless power transmission unit.

8. An auxiliary power device which is detachably connected to a wireless charger which includes a first power input unit, a wireless power transmission unit, and a connector, the auxiliary power device comprising:
   a second power input unit; and
   an auxiliary power unit which includes an input terminal, an output terminal, and a battery, the input terminal being connected to the first power input unit or the second power input unit,
   wherein the auxiliary power unit charges the battery with electrical power supplied from the first power input unit or the second power input unit to the input terminal, or charges the battery and, at the same time, provides the electrical power to the wireless power transmission unit through the output terminal, and provides the electrical power stored in the battery to the wireless power transmission unit through the output terminal when the electrical power supplied from the first power input unit and the second power input unit to the input terminal is cut off.

9. The auxiliary power device of claim 8, further comprising a wired output unit which is connected to the output terminal of the auxiliary power unit.

* * * * *

(12) INTER PARTES REVIEW CERTIFICATE (3315th)
United States Patent
Kim

(10) Number: US 9,490,652 K1
(45) Certificate Issued: Nov. 13, 2023

(54) WIRELESS CHARGER EQUIPPED WITH AUXILIARY POWER SUPPLY AND AUXILIARY POWER DEVICE

(71) Applicant: Sang Beom Kim

(72) Inventor: Sang Beom Kim

(73) Assignee: SCRAMOGE TECHNOLOGY LIMITED

Trial Number:

IPR2022-00532 filed Feb. 3, 2022

Inter Partes Review Certificate for:

Patent No.: 9,490,652
Issued: Nov. 8, 2016
Appl. No.: 14/148,952
Filed: Jan. 7, 2014

The results of IPR2022-00532 are reflected in this inter partes review certificate under 35 U.S.C. 318(b).

INTER PARTES REVIEW CERTIFICATE
U.S. Patent 9,490,652 K1
Trial No. IPR2022-00532
Certificate Issued Nov. 13, 2023

AS A RESULT OF THE INTER PARTES REVIEW PROCEEDING, IT HAS BEEN DETERMINED THAT:

Claims 1-5 and 7 are cancelled.

\* \* \* \* \*